UNITED STATES PATENT OFFICE.

CHARLES PETERS BELLOWS, OF GLOVERSVILLE, NEW YORK.

PROCESS OF CLEANSING GOLD AND SILVER WHERE MECHANICALLY COATED IN ORES WITH REFRACTORY SUBSTANCES.

SPECIFICATION forming part of Letters Patent No. 387,036, dated July 31, 1888.

Application filed August 27, 1887. Serial No. 248,078. (No specimens.)

*To all whom it may concern:*

Be it known that I, CHARLES PETERS BELLOWS, a citizen of the United States, residing at Gloversville, Fulton county, and State of New York, have invented a new and useful process of cleansing gold and silver where mechanically coated in ores with refractory substances, and also decomposing refractory gold and silver bearing ores by the simultaneous and united application of electricity, heat, and chemical action to such ores, whereby such ores, hitherto considered wholly refractory, are rendered free-milling and easily reducible by ordinary methods, of which the following is a specification.

My invention relates to processes for separating the precious metals from gold and silver bearing ores, which ores also contain refractory substances consisting of sulphides, titanides, iridides, osmides, chromides, antimonides, and various other compound combinations in native ores and gravels; and the object of my invention is to provide a process for cleansing the precious metals of all refractory substances which may inclose them, dissolving out the refractory substances or depositing them in the treated ore as an innocuous substance which will not interfere with amalgamation with mercury, thus rendering the ores free-milling. I attain this object in the following manner:

Into a tub constructed of wood, porcelain, or other material which is not a ready conductor of electricity, and is insulated from the floor upon which it rests, I place a chemical bath composed of the following ingredients, to wit: an alkaline solution of any chloride of an alkali, preferably using, on account of its cheapness and efficiency, common salt, to a medium brine of which I add enough soda, preferably caustic soda, to render the solution strongly alkaline, about one ounce of caustic soda to each gallon of brine; but the proportion is not imperative, it being simply necessary that there should be present an alkaline chloride with an excess of alkali. Into my chemical bath I place a perforated crate or basket containing the gold and silver bearing ores, said ores having been broken or crushed until they assume the form of fine gravel, and being prevented from falling out of the crate into the tub by pieces of cotton cloth wrapped about the crate, but being in contact with the chemical bath, since the liquid soaks through the cloth and, by means of the perforations, comes into contact with the ore in the crate. The perforated crate and the cloths wrapped about it are insulated from the tub. Into the chemical bath I place an insulated steam-pipe, by means of which I convey steam into the bath for the purpose of heating the bath. Into the bath I also place a copper plate, rim, or envelope, usually surrounding the perforated crate, but insulated from it, and to which I attach the negative wire of a dynamo. Into the ore contained in the perforated crate I place a copper bar, which is connected to the positive wire of a dynamo. I also place an insulated steam-pipe into the ore contained in the perforated crate, by means of which I convey steam into the mass of gravel, producing heat therein.

When gold or silver bearing ores are ground or crushed into small gravel and placed into a perforated crate and suspended in a tub containing alkaline-chloride solution, and heat is applied to the chemical bath and also to the mass of gravel, and a current of electricity is caused to pass through the mass of gravel containing an anode, through and out of a chemical bath into which the cathode is placed, a chemical action will then take place, whereby the refractory substances will be dissolved or will chemically combine with the substances in the bath and remain in solution or be deposited in the ore as an innocuous salt which will not interfere with amalgamation. The duration of this treatment, the amount of heat required, and the strength of the solution will vary in proportion to the amount and character of the refractory substances with which the precious metals are connected.

I am aware that patents have heretofore been issued for an apparatus for separating the precious metals from refractory substances in gold and silver bearing ores by means of which heat, electricity, and a liquid-bath are to be used, and I am also aware that a patent has already been issued for a process for separating precious metals from gold and silver bearing ores, which process consists in the use of a ferric-salt solution in combination with heat and electricity, and therefore I do not claim, broadly, the process of using heat, electricity, and a liquid-bath as my invention; but What I do claim as my invention is—

The process of cleansing refractory ores prior to the recovery of the precious metals therefrom, which consists in immersing said ores in a solution of a sodium chloride and caustic soda, heating said solution, and at the same time subjecting the ores to the action of the electric current, whereby the ore is rendered free-milling, substantially as described.

CHARLES PETERS BELLOWS.

Witnesses:
EDWIN P. BELLOWS,
JOSEPH F. SPIER.